Patented Feb. 14, 1939

2,147,569

UNITED STATES PATENT OFFICE 2,147,569

VAT DYESTUFFS OF THE ANTHRAQUINONE SERIES

Erich Berthold and Joachim Mueller, Ludwigshafen-on-the-Rhine, Germany, assignors to General Aniline Works, Inc., New York, N. Y., a corporation of Delaware No Drawing. Application January 23, 1935, Serial No. 3,190. In Germany February 1, 1934

8 Claims. (Cl. 260—303)

The present invention relates to vat dyestuffs of the anthraquinone series.

We have found that valuable vat dyestuffs of the anthraquinone series are obtained by preparing aminoanthraquinoneoxazoles, -thiazoles or -imidazoles having the general formula:

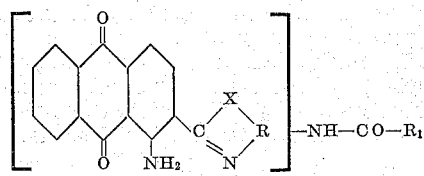

in which X stands for O, S or NH, R for the radicle of an anthraquinone and $R_1$ for a cyclic radicle and which may contain further amino or acylamino groups in at least one of the anthraquinone radicles.

A great variety of methods may be employed for the preparation of the dyestuffs according to this invention. Thus, for example, 1-amino-4-benzoylamino-2-anthraquinonyl - 2',3' - anthraquinoneoxazole having the formula:

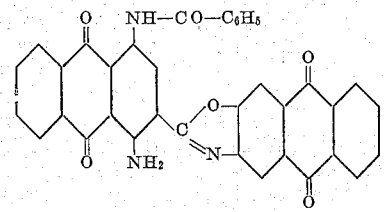

may be prepared as follows:

1-amino-4-halogen- or 1-amino-4-nitro-anthraquinone -2- carbonylamino - 2',3' - hydroxyanthraquinone (obtainable by the condensation of 1-amino-4-halogen- or 1-amino-4-nitroanthraquinone-2-carboxylic acid chloride with 2-amino-3-hydroxyanthraquinone) is converted by heating with ammonia or by reaction with para-toluene sulfamide and subsequent saponification or by reduction into 1,4-diaminoanthraquinone-2-carbonylamino - 2',3' - hydroxyanthraquinone. By ring closure by means of acid condensing agents, such as sulfuric acid or para-toluene sulfonic acid, there is obtained therefrom 1,4-diamino -2- anthraquinonyl-2',3'-anthraquinoneoxazole. The 1-amino-4-halogen- or 1-amino-4-nitroanthraquinone-2-carbonylamino - 2',3' - hydroxyanthraquinone may also be first converted into the corresponding oxazole derivative, the halogen or nitro groups then being replaced by amino groups. By condensing 1-amino-4-nitroanthraquinone-2-aldehyde with 2-amino-3-hydroxyanthraquinone, for example in nitrobenzene in the presence of potassium acetate, 1-amino-4-nitro -2- anthraquinonyl - 2',3' - anthraquinoneoxazole is obtained which can be converted into the corresponding diaminooxazole in the manner already described. Corresponding products may also be obtained by nitration of 1-amino-2-anthraquinonyl - 2',3' - anthraquinoneoxazole and subsequent reduction of the resulting nitro compounds. The 1,4-diamino - 2 - anthraquinonyl-2',3'-anthraquinoneoxazole is then converted into the dyestuff having the formula above mentioned by acting thereon with benzoyl-chloride.

Other vat dyestuffs of the said kind may be prepared in an analogous manner.

The vat dyestuffs thus obtainable have good properties as regards fastness, dye vegetable fibres usually in red to green shades depending on the number of the amino and/or acylamino groups and their position in the molecule. The dyestuffs according to this invention may also be prepared by causing initial materials of the said kind containing halogen to react with acid amides, as for example benzamide or toluene sulfamide.

The following examples will further illustrate how the said invention may be carried out in practice but the invention is not restricted to these examples. The parts are by weight.

Example 1

40 parts of 1-amino-4-nitro-2-anthraquinonyl-2',3'-anthraquinoneoxazole (prepared for example by condensation of 1-amino-4-nitroanthraquinone-2-carboxylic acid chloride with 2-amino-3-hydroxyanthraquinone and conversion of the resulting 1-amino-4-nitroanthraquinone -2- carbonylamino-2',3'-hydroxyanthraquinone into the corresponding oxazole derivative by treating with para-toluene sulfonic acid) are heated in the form of a paste with 2000 parts of water and 80 parts of sodium sulfide while stirring at 90° C. until initial material can no longer be detected. The whole is filtered off by suction and freed from sodium sulfide by washing with water. The 1,4-diamino-2-anthraquinonyl-2',3'-anthraquinoneoxazole obtained is a violet-blue powder which dissolves in concentrated sulfuric acid giving an olive-green coloration and dyes cotton greenish blue shades from a brown-violet vat.

The reduction may also be effected for example with hydrazine hydrate in nitrobenzene. The diamino derivative is then obtained in the form of blue-violet leaflets. If dimethylaniline or another amine of high boiling point such as aniline, toluidine or beta-naphthylamine, be employed instead of hydrazine hydrate, the diamino derivative is also obtained in a pure form. The same compound is also obtained for example by reducing 1-amino-4-nitroanthraquinone - 2 - carbonylamino - 2',3' - hydroxyanthraquinone with hydrazine hydrate and converting the resulting 1,4 - diaminoanthraquinone - 2 - carbonylamino-2',3'-hydroxyanthraquinone into the corresponding oxazole derivative.

10 parts of the 1,4-diamino-2-anthraquinonyl-2',3'-anthraquinoneoxazole prepared according to the first paragraph are heated at 120° C. in 100 parts of nitrobenzene with 10 parts of benzoyl chloride and 1 part of pyridine until initial material can no longer be detected. The resulting 1-amino-4-benzoylamino- 2 -anthraquinonyl-2',3'-anthraquinoneoxazole (blue-violet needles) dissolves in concentrated sulfuric acid giving a brown-olive coloration and dyes vegetable fibres blue shades of excellent fastness to light and chlorine from a blue-violet vat.

By the reduction of 1-amino-4-nitro-2-anthraquinonyl-6'-chlor-2',3'-anthraquinoneoxazole of the formula:

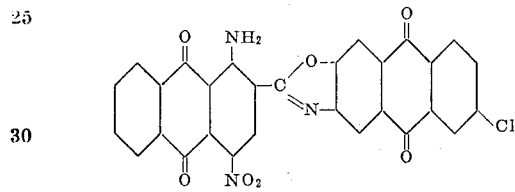

by means of sodium sulfide or the like 1,4-diamino-2 - anthraquinonyl-6'-chlor - 2',3'-anthraquinoneoxazole is obtained the benzoylation product of which prepared in a manner corresponding to that described in the preceding paragraph has similar properties. The para-chlorbenzoylamino derivative (violet-blue needles) obtainable by employing para-chlorbenzoyl chloride instead of benzoyl chloride dyes vegetable fibres reddish blue shades from a violet vat.

Products having similar tinctoral properties are obtained by employing other acid chlorides, as for example brombenzoyl chlorides, cyanbenzoyl chlorides, methoxybenzoyl chlorides, diphenyl-para-carboxylic acid chloride or toluyl acid chlorides instead of benzoyl chloride.

*Example 2*

10 parts of 1,5-dinitro-2-anthraquinonyl-2',3'-anthraquinoneoxazole (obtainable by the condensation of 1,5-dinitroanthraquinone-2-carboxylic acid chloride with 2-amino-3-hydroxyanthraquinone and ring closure of the resulting 1,5- dinitroanthraquinone- 2 -carbonylamino-2',3'-hydroxyanthraquinone with acid agents, such as sulfuric acid) are reduced to the corresponding 1,5-diamino - 2 -anthraquinonyl-2',3'-anthraquinoneoxazole in the manner described in Example 1. The resulting compound dissolves in concentrated sulfuric acid giving a brown-olive coloration and dyes cotton clear, powerful, blue-red shades of excellent fastness to chlorine from a violet vat tinged with olive. By acylation, as for example with benzoyl chloride, the corresponding acylamino derivatives are obtained. The benzoylamino derivative which can be obtained in the manner described in Example 1 dyes cotton powerful fast ruby-red shades.

*Example 3*

10 parts of 1-amino-4-nitro-2-anthraquinonyl-1'(N)-2'(O)-anthraquinoneoxazole (obtainable for example by the condensation of 1-amino-4-nitroanthraquinone-2-carboxylic acid chloride with 1-amino-2-hydroxyanthraquinone and ring closure to form the oxazole in a manner analogous to that described in Example 1) are reduced in 500 parts of water with 20 parts of sodium sulfide in the manner described in Example 1. The 1,4-diamino-2 -anthraquinonyl-1'(N)-2'(O)-anthraquinoneoxazole thus obtained is a red-blue powder which dissolves in concentrated sulfuric acid giving an orange coloration and dyes cotton greenish blue shades from a red-violet vat.

Starting from 1-amino-4-nitro-2-anthraquinonyl-3'-chlor-1'(N)-2'(O) - anthraquinoneoxazole (obtainable for example by the condensation of 1-amino-4-nitroanthraquinone- 2 -carboxylic acid chloride with 1-amino-2-hydroxy-3-chloranthraquinone and ring closure to form the oxazole according to Example 1) there is obtained by reduction, as for example with alkaline hydrosulfite, the corresponding 1.4-diamino-2-anthraquinonyl - 3'-chlor-1'(N)-2'(O)-anthraquinoneoxazole which dyes cotton powerful greenish blue shades from a red-violet vat.

The products obtainable according to the preceding paragraphs are then acylated in a manner corresponding to that described in Example 1 by means of alpha- or beta-naphthoylchloride, anthracene-2-carboxylic acid chloride or the chlorides mentioned in the last paragraph of Example 1. The dyestuffs thus formed are violet to blue crystalline powders which dye vegetable fibres blue to grey shades from violet vats.

*Example 4*

10 parts of 1-amino-4-nitro-2-anthraquinonyl-2',3'-anthraquinoneimidazole (obtainable by heating 1-amino-4-nitroanthraquinone- 2 -carboxylic acid chloride and 2,3-diaminoanthraquinone in the presence of nitrobenzene at from 180° to 200° C.) are reduced in the manner described in Example 1 with sodium sulfide or hydrazine hydrate to form the corresponding 1.4-diamino derivative. The latter dissolves in concentrated sulfuric acid giving an orange coloration and yields blue dyeings from a brown-red vat. By acylation in the manner described in Example 1 with anthraquinone-2-carboxylic acid chloride, a vat dyestuff dyeing vegetable fibres grey shades from a brown-red vat is obtained.

If 1-amino-4-nitro-2-anthraquinonyl-1',2'-anthraquinoneimidazole (obtainable in an analogous manner by employing 1,2-diaminoanthraquinone) be reduced, a diamino compound is obtained which dyes vegetable fibres powerful grey shades from a blue-red vat. The benzoylamino compound obtainable from the dyestuff by benzoylation yields grey dyeings fast to chlorine from a brown-red vat.

*Example 5*

16 parts of 1-aminoanthraquinone-2-carboxylic acid chloride are heated at from 160° to 180° C. with 18 parts of 1,2-diamino-4-benzoylaminoanthraquinone in 500 parts of nitrobenzene until unchanged 1-aminoanthraquinone-2-carboxylic acid chloride can no longer be detected. After cooling, the whole is freed from nitrobenzene and the 1-amino-2-anthraquinonyl-4'-benzoylamino-1',2'-anthraquinoneimidazole is thus obtained as a blue-red powder which dissolves in concentrated sulfuric acid giving a yellow-red coloration and dyes vegetable fibres powerful red-violet shades from a blue-red vat.

By employing 1-amino-4-nitroanthraquinone-2-carboxylic acid chloride instead of 1-aminoanthraquinone-2-carboxylic acid chloride, the corresponding nitroaminoimidazole derivative is obtained which is converted by reduction into the corresponding diaminoimidazole derivative which dyes vegetable fibres powerful reddish grey shades from a blue-red vat.

*Example 6*

10 parts of 1-amino-4-nitro-2-anthraquinonyl-1'(S)-2'(N)-anthraquinonethiazole (obtainable by heating 1-amino-4-nitroanthraquinone-2-carboxylic acid chloride with 1-mercapto-2-aminoanthraquinone at 180° to 200° C. in the presence of nitrobenzene) are heated at 120° C. in 200 parts of nitrobenzene with from 10 to 15 parts of hydrazine hydrate until initial material can no longer be detected. The 1.4-diamino derivative thus obtained is a dark blue powder which dyes the fibres blue-green shades from a violet vat. By acylation, as for example by means of benzoyl chloride, dyestuffs giving bluish green dyeings of good properties as regards fastness are usually obtained.

By starting from the corresponding 1-amino-4-nitro-2-anthraquinonyl- 1-1'(N)-2'(S) - anthraquinonethiazole (obtainable from 1-amino-2-nitroanthraquinone-2-carboxylic acid chloride and 1-amino- 2 - mercaptoanthraquinone), reducing the nitro group and acylation by means of orthochlorbenzoylchloride, a dyestuff having similar properties is obtained.

*Example 7*

25 parts of 1,2,4-triaminoanthraquinone and 66 parts of 1-amino-4-nitroanthraquinone-2-carboxylic acid chloride in 1500 parts of nitrobenzene are heated for 2 hours at 150° C. and for 3 hours at 190° C. The nitrobenzene is then removed in the usual manner and the dyestuff is obtained in the form of a red powder which dissolves in concentrated sulfuric acid giving a yellow-red coloration and dyes the fibres powerful blue-grey shades from a red-violet vat. The dyestuff corresponds to the formula:

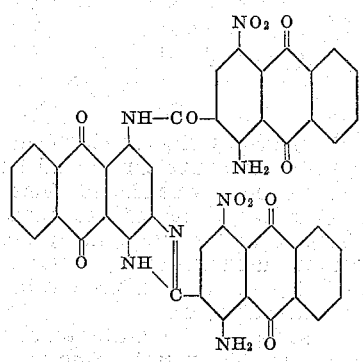

*Example 8*

A mixture of 24 parts of the 1,4-diamino-2-anthraquinonyl-2',3'-anthraquinoneoxazole (obtainable according to Example 1), 25 parts of anthraquinone-2-carboxylic acid chloride, 500 parts of nitrobenzene and 3 parts of anhydrous pyridine is slowly heated at 150° C. Heating is continued until initial material is no longer detectable. After working up, blue-violet needles are obtained which dissolve in concentrated sulfuric acid giving a brown-yellow coloration dyeing vegetable fibres grey-blue shades of excellent fastness to light from a violet vat.

By employing 1-chloranthraquinone-2-carboxylic acid chloride or 1,4-dichloranthraquinone-2-carboxylic acid chloride or 1,4-dichloranthraquinone-6-carboxylic acid chloride instead of anthraquinone-2-carboxylic acid chloride similar dyestuffs are obtained which dye vegetable fibres likewise grey-blue shades of excellent fastness properties.

By employing 1-aminoanthraquinone-2-carboxylic acid chloride a dyestuff is obtained which dyes vegetable fibres violet shades.

*Example 9*

A mixture of 40 parts of 1,4-diaminoanthraquinone-2-carbonylamino-2',3'- bromanthraquinone (obtainable for example by reducing 1-amino-4-nitroanthraquinone- 2 -carbonylamino-2',3'-bromanthraquinone with hydrazine hydrate in the presence of nitrobenzene at about 80° C.) and 450 parts of phenol is heated at 150° C. After adding 60 parts of sodium sulfite and 80 parts of sulfur, the mixture is heated at from 170° to 180° C. until initial material is no longer detectable. It is then diluted with nitrobenzene and the reaction product filtered off while hot. The 1,4-diamino-2 - anthraquinonyl-2'(N) -3'(S) - anthraquinonethiazole dissolves in concentrated sulfuric acid giving a brown-yellow coloration and dyes vegetable fibres clear greenish blue shades from a violet vat.

A mixture of 10 parts of the compound thus obtained, 150 parts of nitrobenzene, 10 parts of benzoylchloride and 5 parts of pyridine is heated at 120° C. until initial material is no longer detectable. After working up, a dyestuff is obtained in the form of blue-violet needles which dissolves in concentrated sulfuric acid giving a green coloration and dyes vegetable fibres from a violet vat greenish blue shades of excellent fastness to light and to chlorine.

Instead of benzoylchloride 1,4-dichloranthraquinone-2-carboxylic acid chloride may be employed a dyestuff dyeing vegetable fibres blue-grey shades being obtained.

By employing 1,4-dichloranthraquinone-6-carboxylic acid chloride a dyestuff dyeing vegetable fibres greenish grey shades is obtained.

*Example 10*

A mixture of 30 parts of the compound obtainable by condensing 1 molecular proportion of 1,4-diamino-2,3-dichloranthraquinone and 2 molecular proportions of 1-amino-anthraquinone-2-carboxylic acid chloride in the presence of nitrobenzene at 120° C., 300 parts of nitrobenzene, 15 parts of anhydrous potassium acetate and 0.5 part of copper powder is heated at from 180° to 190° C. until initial material is no longer detectable. The dyestuff which corresponds to the formula:

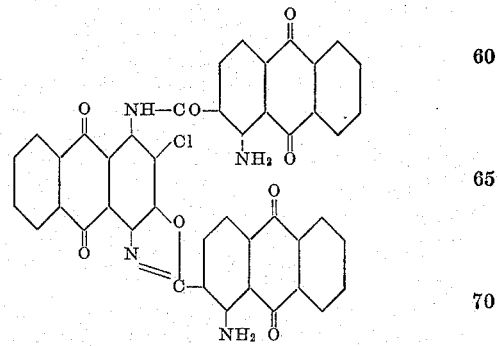

is filtered off by suction, washed with benzene and methanol and dried. It dissolves in concentrated sulfuric acid giving a brown-yellow coloration and dyes vegetable fibres reddish violet shades of very good fastness from a blue-red vat.

*Example 11*

A mixture of 48 parts of the oxazole obtainable according to the first paragraph of Example 1, 40 parts of terephthaloylchloride, 500 parts of nitrobenzene and 2 parts of pyridine is heated at 150° C. until initial material is no longer detectable. After working up, a dyestuff is obtained in the form of violet crystals which dissolves in concentrated sulfuric acid giving a brown-red coloration and dyes vegetable fibres blue shades from a red-violet vat.

By employing isophthaloylchloride a dyestuff having similar properties is obtained.

*Example 12*

A mixture of 12 parts of the oxazole obtainable according to the first paragraph of Example 1, 10 parts of quinoline-2-carboxylic acid chloride, 200 parts of nitrobenzene and 1 part of pyridine is heated to 120° C. until initial material is no longer detectable. After working up, a dyestuff is obtained in the form of blue violet needles which dyes vegetable fibres clearly blue shades from a violet vat.

By employing other chlorides of quinolinecarboxylic acids, quinoline-5,8-dicarboxylic acid chloride or naphthoquinolinecarboxylic acid chlorides dyestuffs having similar properties are obtained.

*Example 13*

A mixture of 12 parts of the oxazole obtainable according to the first paragraph of Example 1, 10 parts of anthraquinone-1(N),2,1′,2′(N)-benzacridone-5′-carboxylic acid chloride, 250 parts of nitrobenzene and 1 part of pyridine is heated at from 180° to 200° C. until initial material is no longer detectable. After working up, a dyestuff is obtained in the form of blue crystals which dyes vegetable fibres reddish grey shades from a violet vat.

By employing anthraquinone-1(N),2,1′,2′(N)-benzacridone-3′-carboxylic acid chloride a dyestuff having similar properties is obtained.

Similar dyestuffs are obtained by employing 1,9-pyrazoleanthrone-2-carboxylic acid chloride.

*Example 14*

A mixture of 12 parts of the oxazole obtainable according to the first paragraph of Example 1, 10 parts of anthraquinone-1(S),2,1′,2′(S)-benzthioxanthone-3-carboxylic acid chloride, 500 parts of nitrobenzene and 0.5 part of pyridine is heated to 180° C. until initial material is no longer detectable. After working up, a dyestuff is obtained in the form of greenish blue crystals which dissolves in concentrated sulfuric acid giving a reddish yellow coloration. It dyes vegetable fibres bluish grey shades from a violet bath.

By employing 1.9-thiazoleanthrone-2-carboxylic acid chloride a dyestuff having similar properties is obtained.

If instead of the oxazole employed as starting material 1,4-diamino - 2 - anthraquinonyl-2′(N),3′(S)-anthraquinonethiazole or 1,4-diamino - 2 - anthraquinonyl -1′(S),2′(N)-anthraquinonethiazole or 1,4-diamino-2-anthraquinonyl-1′(N),2′(S)-anthraquinonethiazole is employed dyestuffs having similar properties are obtained.

Applicants have filed application Serial No. 129,818 which describes and claims divisional subject-matter.

What we claim is:

1. Vat dyestuffs of the anthraquinone series corresponding to the general formula:

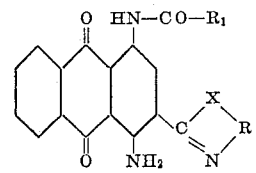

in which X stands for a member of the group consisting of O, S and NH, R for the radicle of an anthraquinone and $R_1$ for a nuclear radical having up to three condensed six-membered rings selected from the class consisting of the benzene and pyridine rings and the halogen, cyano, alkoxy and alkyl substituted benzene and pyridine rings, the number of pyridine rings present in the said radical not exceeding one.

2. Vat dyestuffs of the anthraquinone series corresponding to the general formula:

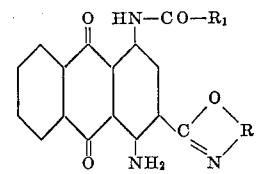

in which R stands for the radicle of an anthraquinone and $R_1$ for a nuclear radical having up to three condensed six-membered rings selected from the class consisting of the benzene and pyridine rings and the halogen, cyano, alkoxy and alkyl substituted benzene and pyridine rings, the number of pyridine rings present in the said radical not exceeding one.

3. Vat dyestuffs of the anthraquinone series corresponding to the general formula:

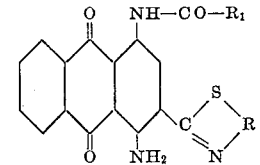

in which R stands for the radicle of an anthraquinone and $R_1$ for a nuclear radical having up to three condensed six-membered rings selected from the class consisting of the benzene and pyridine rings and the halogen, cyano, alkoxy and alkyl substituted benzene and pyridine rings, the number of pyridine rings present in the said radical not exceeding one.

4. Vat dyestuffs of the anthraquinone series corresponding to the general formula:

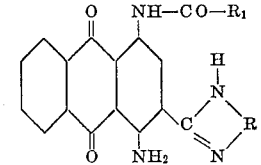

in which R stands for the radicle of an anthraquinone and $R_1$ for a nuclear radical having up to three condensed six-membered rings selected from the class consisting of the benzene and pyridine rings and the halogen, cyano, alkoxy and alkyl substituted benzene and pyridine rings, the number of pyridine rings present in the said radical not exceeding one.

5. Vat dyestuffs of the anthraquinone series corresponding to the general formula:

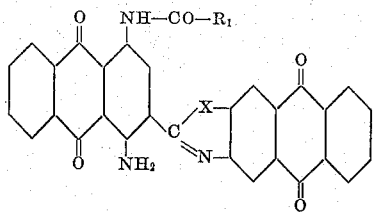

in which X stands for a member of the group consisting of O, S and NH and R₁ for a nuclear radical having up to three condensed six-membered rings selected from the class consisting of the benezene and pyridine rings and the halogen, cyano, alkoxy and alkyl substituted benzene and pyridine rings, the number of pyridine rings present in the said radical not exceeding one.

6. Vat dyestuffs of the anthraquinone series corresponding to the general formula:

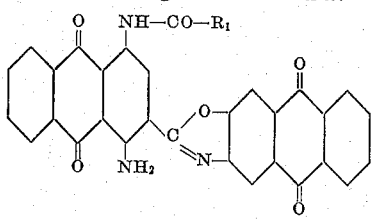

in which R₁ stands for a mononuclear benzene radicle.

7. The vat dyestuffs coresponding to the formula:

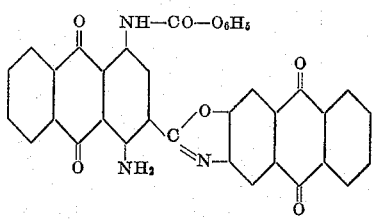

which dissolves in concentrated sulfuric acid giving a brown-olive coloration and dyeing vegetable fibres very fast blue shades from a blue violet vat.

8. The vat dyestuff corresponding to the formula:

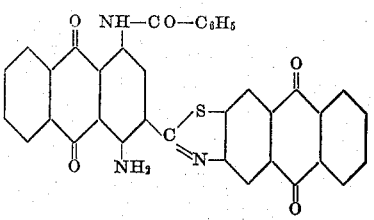

which dissolves in concentrated sulfuric acid giving a green coloration and dyeing vegetable fibres very fast greenish blue shades from a violet vat.

ERICH BERTHOLD.
JOACHIM MUELLER.